United States Patent [19]

Takahashi

[11] 4,172,313
[45] Oct. 30, 1979

[54] GASKET INSTALLING DEVICE

[75] Inventor: Kihei Takahashi, Uozu, Japan

[73] Assignee: Yoshida Kogyo K.K., Tokyo, Japan

[21] Appl. No.: 879,714

[22] Filed: Feb. 21, 1978

[30] Foreign Application Priority Data

| Feb. 24, 1977 | [JP] | Japan | 52-22072[U] |
| Feb. 28, 1977 | [JP] | Japan | 52-21892 |
| Mar. 9, 1977 | [JP] | Japan | 52-28933[U] |
| Mar. 16, 1977 | [JP] | Japan | 52-29481 |

[51] Int. Cl.$^2$ .............................................. B23P 19/02
[52] U.S. Cl. ................................................ 29/235
[58] Field of Search .............. 29/235, 243.5, 243.52, 29/243.57, 243.58; 81/3 R

[56] References Cited

U.S. PATENT DOCUMENTS

| 2,761,199 | 9/1956 | Allen | 29/235 |
| 3,007,240 | 11/1961 | Heinrich | 29/235 |
| 3,284,886 | 11/1966 | Provencher | 29/235 |
| 3,798,739 | 3/1974 | Fritz | 29/235 |

FOREIGN PATENT DOCUMENTS 51-11482  9/1976  Japan

*Primary Examiner*—James G. Smith
*Attorney, Agent, or Firm*—Hill, Van Santen, Steadman, Chiara & Simpson

[57] ABSTRACT

A gasket installing device comprises a hollow frame and a guide roller rotatably mounted at a leading end of the hollow frame for rolling movement over a panel edge along which a gasket is to be installed. A presser wheel is rotatably disposed in the hollow frame and has means on its circumference for engaging and pressing the gasket against the panel edge at a position adjacent to an open side of the hollow frame. A gasket guide disposed in the hollow frame adjacent to the leading end has a passage for the gasket to pass therethrough, the passage extending at an angle to the open side. The passage has a discharge opening spaced from the above-mentioned position and from the open side. The hollow frame supports a correction roller assembly on its trailing end for correcting the installed gasket into proper disposition over the panel edge. A cutter arm is disposed in and pivoted to the hollow frame, the cutter arm having a cutter thereon and being pivotable to move the cutter blade into and out of a slot in the gasket guide across the gasket passage in response to the movement of a lever pivotally mounted on the hollow frame.

31 Claims, 22 Drawing Figures

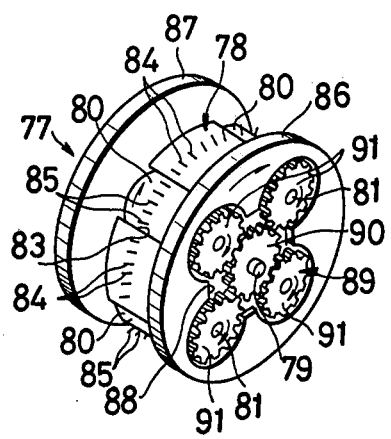
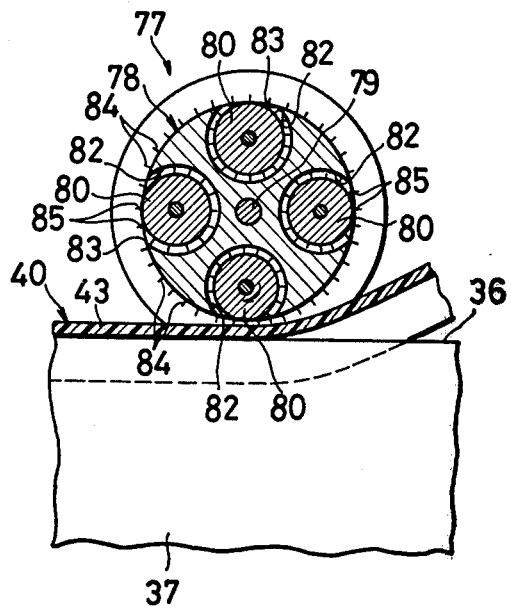
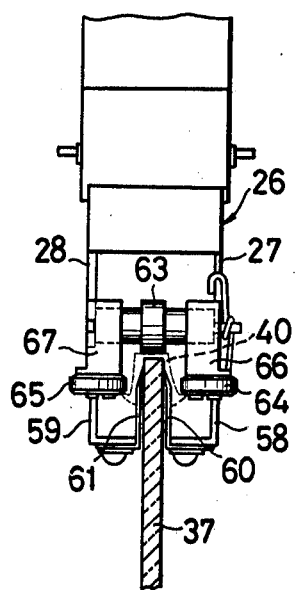
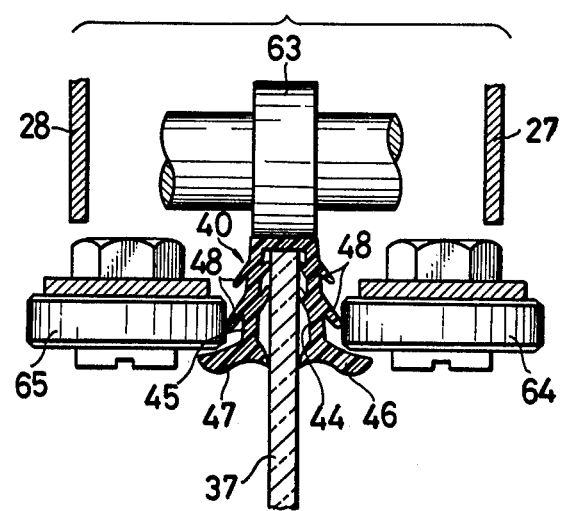

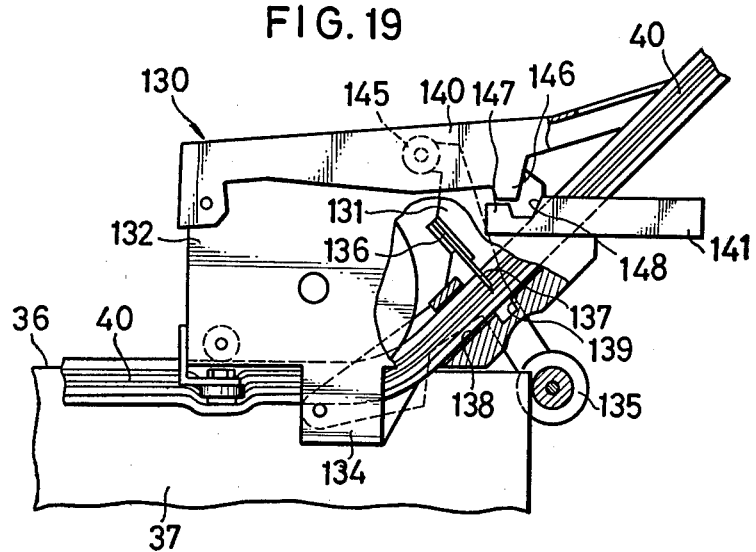
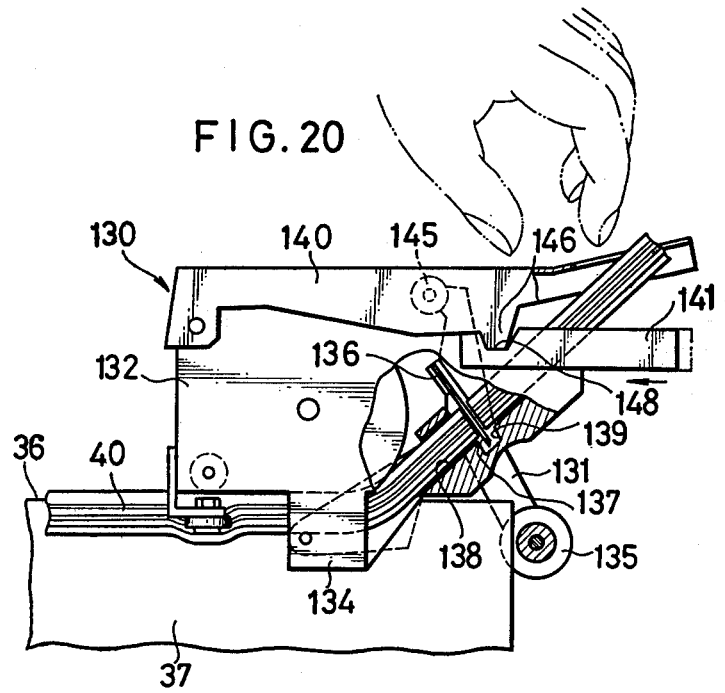

GASKET INSTALLING DEVICE

BACKGROUND OF THE INVENTION

1. Field of the Invention

The present invention relates to a device for installing an elongate gasket continuously along an edge of a panel such as a pane of glass.

2. Prior Art

It has been customary to mount an elongate gasket along an edge of a panel solely by hand. Such gasket is made of a flexible and elastic material such as rubber or synthetic resin, which requires much skill on the part of the installer to prevent the installed gasket's becoming excessively loose or stretched due to changes in ambient temperature and stresses exerted during attachment.

SUMMARY OF THE INVENTION

A device for installing an elongate gasket continuously along an edge of a panel comprises a hollow frame having an open side, and a presser wheel rotatably disposed in the hollow frame between its leading and trailing ends, the presser wheel having means on its circumference for engaging and pressing the gasket against the panel edge at a position adjacent to the open side of the frame. A gasket guide is disposed in the hollow frame adjacent to the leading end and has a passage for permitting the gasket to pass therethrough toward the above-mentioned position, the passage extending at an angle to the open side and having a discharge opening spaced from the above-mentioned position and from the leading end. A correction roller assembly is mounted on the trailing end of the frame for pressing the gasket into a desired disposition over the panel edge. A cutter arm is disposed in and pivoted to the hollow frame, the cutter arm having a cutter thereon and being pivotable to move the cutter blade into and out of a slot in the gasket guide extending across the passage.

An object of the present invention is to provide a gasket installing device which enables an unskilled worker to install a gasket reliably and speedily.

Another object of the present invention is to provide a gasket installing device which can minimize the tension that an elongated gasket will undergo while being mounted continuously on the panel edge.

Still another object of the present invention is to provide a gasket installing device having a correction roller assembly which can correct an attached gasket into a proper disposition over the panel edge.

A further object of the present invention is to provide a gasket installing device having a gasket guide which will produce minimum resistance to a gasket passing therethrough and can eliminate any twist in the gasket before it is installed onto the panel edge.

A still further object of the present invention is to provide a gasket installing device having means for automatically cutting a gasket at a point corresponding to a corner of a panel about which the gasket is to be bent and for severing the gasket at a desired point.

Many other advantages, features and additional objects of the present invention will become manifest to those versed in the art upon making reference to the detailed description and the accompanying drawings in which preferred structural embodiments incorporating the principles of the present invention are shown by way of illustrative example.

BRIEF DESCRIPTION OF THE DRAWINGS

FIG. 6 is a perspective view of a modified presser wheel assembly;

FIG. 7 is a vertical cross-sectional view of the manifold presser wheel assembly illustrated in FIG. 6;

FIG. 8 is a rear elevational view of the gasket installing device shown in FIG. 1;

FIG. 9 is an enlarged cross-sectional view taken along line IX—IX of FIG. 1;

FIG. 19 is a side elevational view of the device shown in FIG. 16, illustrating the manner in which a cutter cuts a gasket;

FIG. 20 is a view similar to FIG. 19, showing the manner in which the cutter severs the gasket;

DETAILED DESCRIPTION

Figure 1:
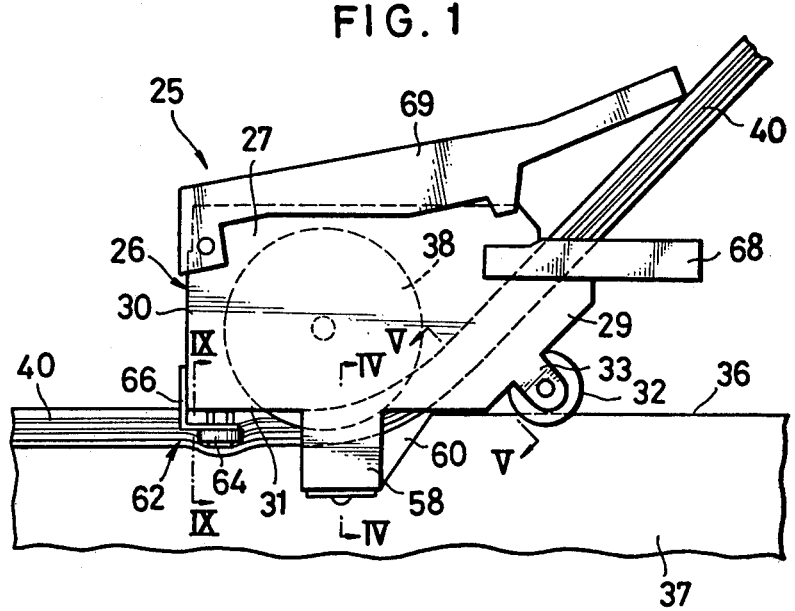
FIG. 1 is a side elevational view of a gasket installing device constructed in accordance with the present invention.
Figure 2:
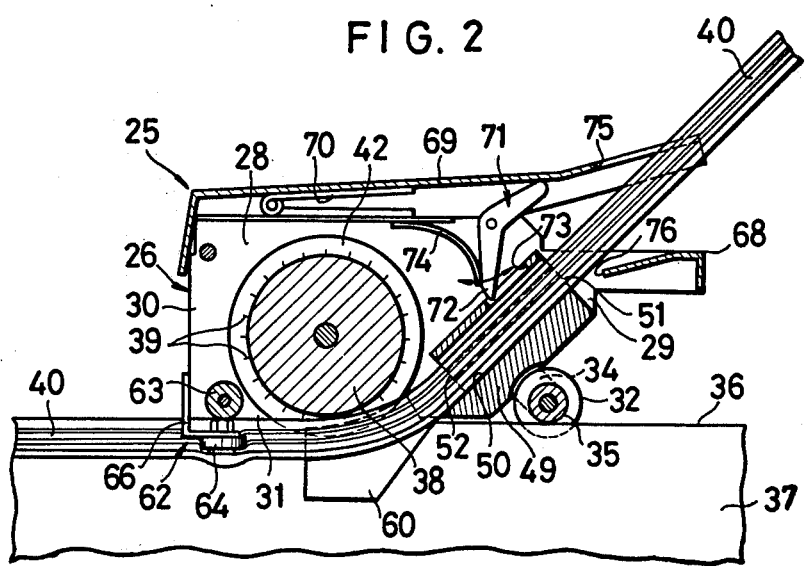
FIG. 2 is a vertical cross-sectional view of the device shown in FIG. 1.

The principles of the present invention are particularly useful when embodied in a gasket installing device such as shown in FIGS. 1 and 2, generally indicated by the numeral 25.

The gasket installing device 25 comprises a hollow frame 26 including a pair of spaced sidewalls 27,28 connected together at their upper edges, the frame 26 having a leading end 29, a trailing end 30, and an open lower side 31. A guide means such as a guide roller 32 is rotatably supported between a pair of arms 33,34 extending respectively from the frame sidewalls 27,28 at the leading end 29. The guide roller 32 has a circumferential groove 35 and is adapted to ride over an edge 36 of a panel 37 such as a pane of glass in rolling engagement therewith for guiding the hollow frame 26 to move therealong.

A presser wheel 38 is rotatably disposed in the hollow frame 26 and is supported between the sidewalls 27,28, the presser wheel 38 being located between the leading end 29 and the trailing end 30. The presser wheel 38 has on its circumference a row of pointed projections or needles 39, extending radially outwardly therefrom and spaced circumferentially apart from each other. The needles 39, as they arrive at a position adjacent to the open side 31 of the frame 26 during the rotation of the presser wheel 38 successively pierce an elongate gasket 40 to hold it down against the panel edge 26. The presser wheel 38 has a periphery from which the needles 39 project. The portion of the periphery having those needles 39 that are in engagement with the gasket 40 is out of contact with the gasket 40. A pair of flanges 41,42 (FIG. 4), disposed peripherally on the presser wheel 38, are spaced from each other axially of the presser wheel 38 with the row of needles 39 therebetween.

Figure 3:
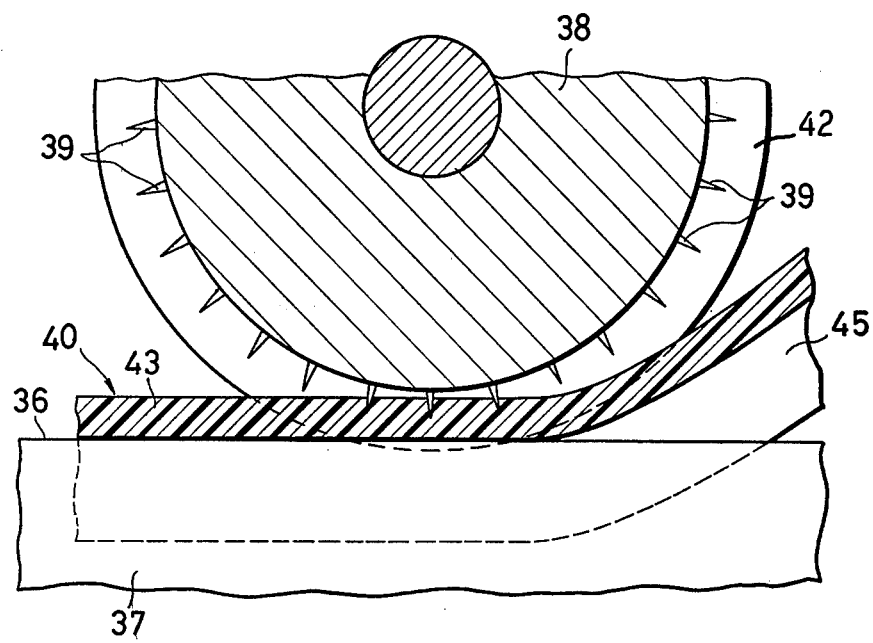
FIG. 3 is a fragmentary enlarged view of a presser wheel pressing a gasket against a panel edge.
Figure 4:
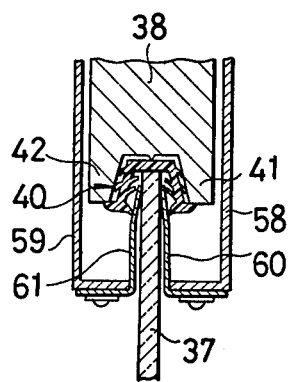
FIG. 4 is an enlarged cross-sectional view taken along line IV—IV of FIG. 1.
Figure 5:
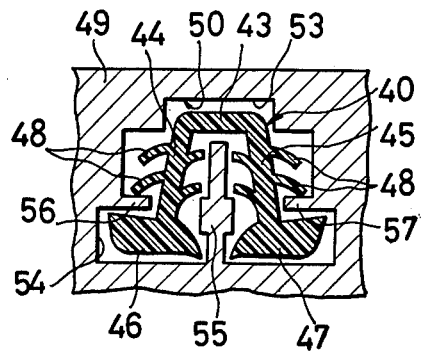
FIG. 5 is an enlarged cross-sectional view taken along line V—V of FIG. 1.

As best shown in FIG. 5, the elongate gasket 50 includes a bottom 43 to be placed on the panel edge 36 and a pair of sidewalls 44,45 to be held against the opposite surfaces of the panel 37 along the edge 36. During installation, the needles 39 on the wheel 38 engage and press the bottom 43 of the gasket 40 against the panel edge 36 and the flanges 41,42 constrain the sidewalls 44,45 of the gasket 40 (FIGS. 3 and 4). The gasket 40 additionally includes a pair of lips 46,47 respectively on the distal edges of the sidewalls 44,45 for sealing engagement with the opposite surfaces of the panel 37 and with the edges of a panel frame (not shown), and a plurality of inner and outer sealing strips 48 on the gasket sidewalls 44,45 for engagement with the panel 37 and the panel frame.

A gasket guide or guide block 49 (FIG. 2) is disposed in the hollow frame 26 adjacent to the leading end 29, the gasket guide 49 having a passage 50 for permitting the gasket 40 to pass therethrough. The passage 50 has an inlet opening 51 at one end and a discharge opening 52 at the other end, and extends at an angle to the open side 31 with the discharge opening 52 adjacent to the open side 31. The discharge end 52 is spaced upwardly from the open side 31 and forwardly from the position where the needles 39 engage the gasket 40.

As shown in FIG. 5, the passage 50 in the gasket guide or guide block 49 has a cross-sectional configuration which loosely accommodates the exterior surfaces of the gasket 40, and to that end includes a first chamber 53 for accommodating the bottom 43 and sidewalls 44,45 of the gasket 40 therein, and a second chamber 54 communicating with the first chamber 53 for accommodating the lips 46,47 therein. The first chamber 53 is narrower than the second chamber 54. A partition 55 extends centrally from the bottom of the second chamber 54 into the first chamber 53, but terminates short of the top of the first chamber 53, and thus divides the second chamber into a pair of subchambers, one for each lip 46,47. A pair of projections 56,57 disposed between the first and second chambers 53,54 extend toward each other. With this passage cross section, the lips 46,47 of the gasket 40 are confined in the second chamber 54 by the projections 56,57, and the sealing strips 48 are trapped in the first chamber 53 also by the projections 56,57. Further, the gasket 40 is prevented from lateral displacement by the central partition 55 positioned between the gasket sidewalls 44,45. Accordingly, any twist that the gasket 40 may have before entering the passage 50 can be removed while the gasket passes through the passage 50, and deforming stresses which would otherwise interfere with gasket installation will not be developed. In addition, with points of contact between the gasket 40 and the gasket guide 49 held to a minimum, resistance to the movement of the gasket 40 through the passage 49 is minimized.

The sidewalls 27,28 of the hollow frame 26 have a pair of downwardly extending legs 58,59 (FIGS. 1 and 4), respectively, which have their distal ends bent toward one another. To the bent ends of the legs 58,59 are respectively attached a pair of guide plates 60,61 extending upwardly toward the presser wheel 38 substantially parallel to each other, the free edges thereof converging as they extend between the flanges 41,42 on the wheel 38. As better illustrated in FIGS. 1 and 2, each guide plate such as 60 extends from one of the legs 58,59 toward the discharge opening 52 of the passage 50. In operation, the sidewalls 44,45 of the gasket 40 as it is pulled out of the discharge opening 52 are led by the guide plates 60,61, respectively, with the panel 37 sandwiched therebetween, to slide thereover, backed by the wheel flanges 41,42, to the position of engagement by the wheel needles 39.

A correction roller assembly 62 is mounted on the frame 26 at the trailing end 30 near the open side 31. The correction roller assembly 62 includes a central vertical roller 63 (FIGS. 2 and 8) rotatably supported between the frame sidewalls 27,28 for pressing the gasket bottom 43 against the panel edge 36, and a pair of side horizontal rollers 64,65 (FIG. 8) rotatably mounted respectively on a pair of brackets 66,67 fixed to the sidewalls 27,28 for pressing the gasket sidewalls 44,45 against the opposite surfaces of the panel 37 along its edge 36, with the outer edges of the lips 46,47 forced downwardly by the rollers 64,65 (FIG. 9). Thus the correction roller assembly 62 corrects the gasket 40 installed by the presser wheel 38 into a proper disposition over the panel edge 36.

The assembly 62 serves also as a guide to direct the device 25 for movement along the edge 36 of the panel 37 at a fixed distance therefrom.

As shown in FIGS. 1 and 2, a handle 68 is fixed to the frame 26 at the leading end 29 and projects away from the trailing end 30. A lever 69 is pivotally mounted on the frame 26 with one end pivoted near the trailing end 30, the other end thereof being positioned over the handle 68. The lever 69 is angularly movable toward and away from the handle 68, and is normally biased away from the handle 68 by means of a spring 70 acting between the lever 69 and the frame 26. A gasket check member 71 is disposed between the frame sidewalls 27,28 and is centrally pivoted to the frame 26. The gasket check member 71 has one end acting as a prong 72 movable through a hole 73 into and out of the path of movement of the gasket 40 in the passage 50, the other end of the member 71 engaging the lever 69. A spring 74 acting between the frame 26 and the gasket check member 71 normally urges the prong 72 to project into the passage 50, thereby frictionally engaging the gasket 40 therein to arrest its movement. When the lever 69 is angularly moved toward the handle 68 by gripping them together, the gasket check member 71 is pivoted to move the prong 72 out of the passage 50 against the force of the spring 74, whereupon the gasket 40 becomes freely movable through the passage 50.

The lever 69 and the handle 68 have openings 75,76, respectively, which jointly provide a passageway through which the gasket 40 can be supplied to the inlet opening 51 of the passage 50.

For installation of the gasket 40 continuously on and over the panel edge 36, the end of the gasket 40 is inserted through the passage 50 until it extends under the presser wheel 38 for engagement by the needles 39. Then, the lever 69 and the handle 68 are gripped together to move the lever 69 toward the handle 68 until the prong 72 is retracted out of the passage 50. The gasket installing device 25 is pulled along the panel edge 36, whereupon the gasket 40 is engaged by the needles 39 on the presser wheel 38 and is supplied over the panel edge 36 as it pressed against the panel edge 36. The gasket 40 is then rectified by the correction roller assembly 62 so as to be properly disposed over the panel edge 36.

FIGS. 6 and 7 illustrate a modified presser wheel assembly 77 which comprises a presser wheel 78 rotatable about a shaft 79 fixed to or mounted nonrotatably on the frame 26 of the device 25. The presser wheel 78 contains a plurality of cylindrical feed rollers 80, four in the illustrated embodiment, mounted therein for rotation about and with axles 81 parallel to the shaft 79. The four feed rollers 80 are circumferentially spaced 90 degrees apart from each other with the shaft 79 located centrally. Each of the feed rollers 80 is disposed in an axial hole 82 in the wheel 78 communicating radially with the exterior through a peripheral opening 83 extending end to end of the wheel 78. Each feed roller 80 has a circumferential surface disposed in the opening 83 and lying substantially flush with the circumference of the wheel 78. The presser wheel 78 has on its circumference except at the openings 83 a plurality of pointed projections or needles 84 extending radially outwardly therefrom and spaced circumferentially apart from each other. Each feed roller 80 also has on its circumference a plurality of needles 85 extending radially outwardly therefrom and spaced circumferentially apart from each other. The needles 84 on the wheel 78 and the needles 85 on the feed rollers 80 are equal in the length of projection and are arranged in a row.

The presser wheel 78 has a pair of spaced flanges 86,87 at the opposite ends of the wheel 78. The end of the wheel 78 having the flange 86 has a recess 88 in which there is disposed a gear mechanism 89 through which the feed rollers 80 are rotatable in response to the rotation of the presser wheel 78. The gear mechanism 89 comprises a sun gear 90 fixed to the stationary shaft 79 and planet gears 91 fixed respectively to the rotatable axles 81, the sun gear 90 being in driving mesh with the planet gears 91. Therefore, as the sun gear 90 is fixed relatively to the frame 26 of the device 25, when the presser wheel 78 is rotated, the planet gears 91 are driven to rotate, thereby enabling the feed rollers 80 to rotate relatively to the presser wheel 78 in the same direction as the direction in which the presser wheel 78 rotates. With this modification, each feed roller 80 as its needles 85 engage the gasket 40 can positively feed the gasket 40 along the panel edge 36 in a direction opposite to that in which the device 25 advances, during disengagement of the needles 84 on the presser wheel 78 from the gasket 40.

Figure 10:
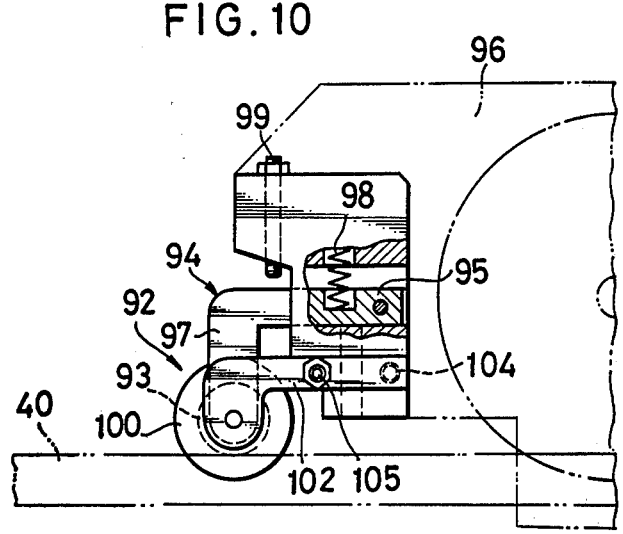
FIG. 10 is an enlarged side elevational view, partly broken away, of a modified correction roller assembly.
Figure 11:
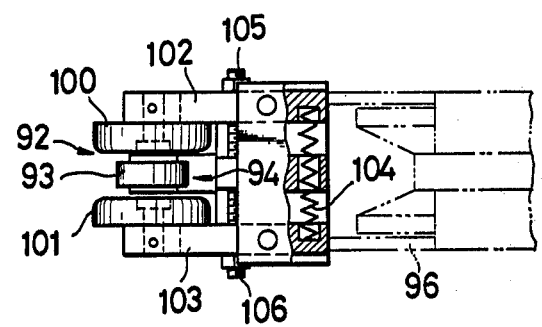
FIG. 11 is a bottom view, partly broken away, of the modified correction roller assembly illustrated in FIG. 10.
Figure 12:
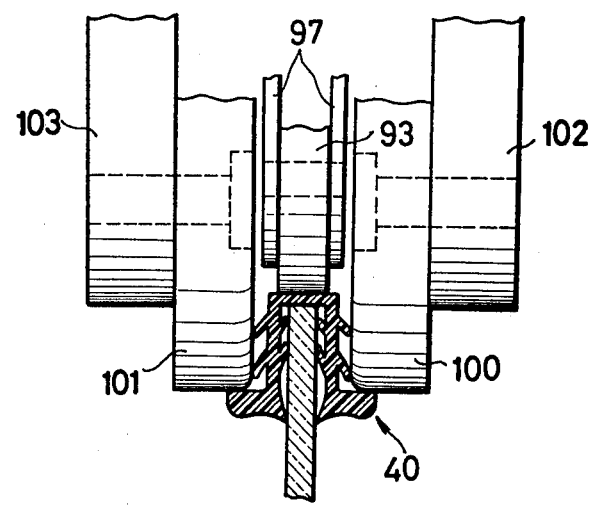
FIG. 12 is a fragmentary enlarged rear elevational view of the assembly shown in FIG. 10.

A modified correction roller assembly 92 illustrated in FIGS. 10 through 12 comprises a vertical central roller 93 supported on an L-shaped support 94. The L-shaped support has a horizontal arm 95 pivoted to a frame 96 at its free end and a bifurcated vertical arm 97 supporting the central roller 93 on its free end. The horizontal arm 95 is normally urged downwardly by a spring 98 acting between the arm 95 and the frame 96 at a position between the pivot and the vertical arm 97. An adjustable stop 99 is mounted on the frame 96 and is engageable with the horizontal arm 95 to limit the upward angular movement of the support 94. The correction roller assembly 92 further comprises a pair of horizontal side rollers 100,101 arranged one on each side of the central roller 93. Each of the side rollers 100,101 is supported respectively on one end of a pair of spaced side arms 102,103 pivoted to the frame 96 near their other ends. The sides arms 102,103 are normally biased by a spring 104 acting between them at said other ends in a direction to move the side rollers 100,101 toward each other. A pair of adjustable stops 105,106 are mounted respectively on the side arms 102,103 and are each located between the pivot and the side roller, the stops 105,106 being engageable with the frame 96 to restrict the angular movement of the side rollers 100,101 toward each other. The central roller 93 and side rollers 100,101 are pressed against the gasket 40 forcibly by the springs 98,104 to correct the disposition of the gasket 40 over the panel edge more reliably. The extent of biased displacement of the central roller 93 and of the side rollers 100,101 is variable by adjusting the stops 99,105 and 106 so that the correction roller assembly 92 can be used for gaskets of different cross-sectional shapes.

Figure 13:
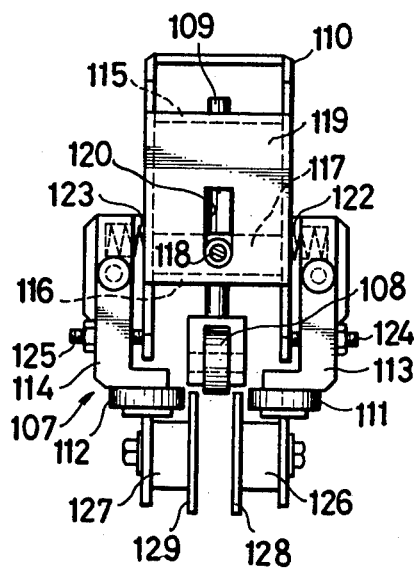
FIG. 13 is a rear elevational view of another modified correction roller assembly.
Figure 14:
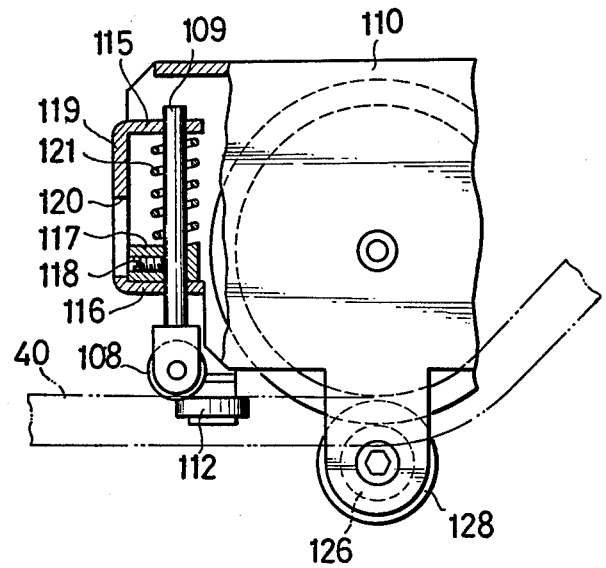
FIG. 14 is a side elevational view, with parts cut away, of the assembly shown in FIG. 13.
Figure 15:
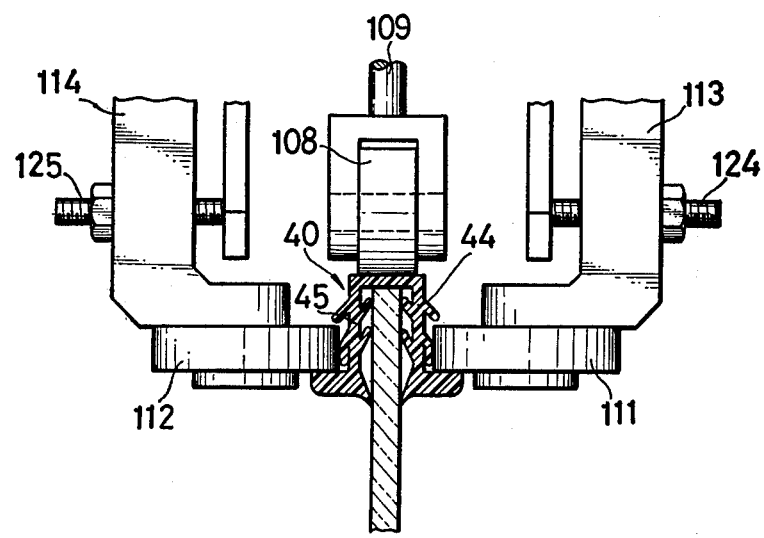
FIG. 15 is a fragmentary enlarged rear elevational view of the assembly of FIG. 13.

FIGS. 13 through 15 show another modified correction roller assembly 107 comprising a vertical central roller 108 supported on the lower end of a vertical support or rod 109 slidably mounted on a frame 110, and a pair of horizontal side rollers 111,112 supported respectively on the lower ends of a pair of spaced side arms 113,114 pivotally mounted on the frame 110. The rod 109 extends through a pair of spaced walls 115,116 and carries an adjustable stop 117 thereon. The stop 117 is slidable along, but fastenable to the rod 109 by a set screw 118. Extending between the walls 115,116 is a cover plate 119 in which there is provided a vertical slot 120 extending parallel to the rod 109, through a screwdriver may reach the set screw 118. A spring 121 extends between the wall 115 and the stop 117 around the rod 109 to normally urge the rod 109 downwardly. The side arms 113,114 are pivoted near their upper ends to the frame 110, and are normally biased by a pair of springs 122,123, respectively, acting between the frame 110 and the upper ends of the side arms 113,114, in a direction to force the side rollers 111,112 toward each other. The side arms 113,114 carry a pair of adjustable stops 124,125, respectively, each at a position between the pivot and the lower end, which adjustable stops are engageable with the frame 110 to limit the pivoted movement of the side arms 113,114 toward each other.

A pair of side wheels 126,127 are carried by the frame 110 and have a pair of opposed flanges 128,129, respectively, which are engageable with the sidewalls 44,45 of the gasket 40 to keep them spaced apart before attachment onto the panel edge.

Figure 16:
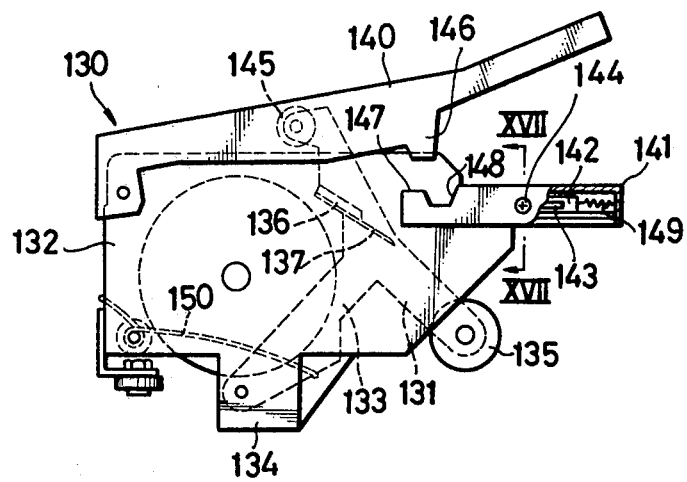
FIG. 16 is a side elevational view of a second embodiment of a installing device.
Figure 17:
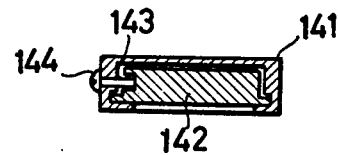
FIG. 17 is an enlarged cross-sectional view taken along line XVII—XVII of FIG. 16.
Figure 18:
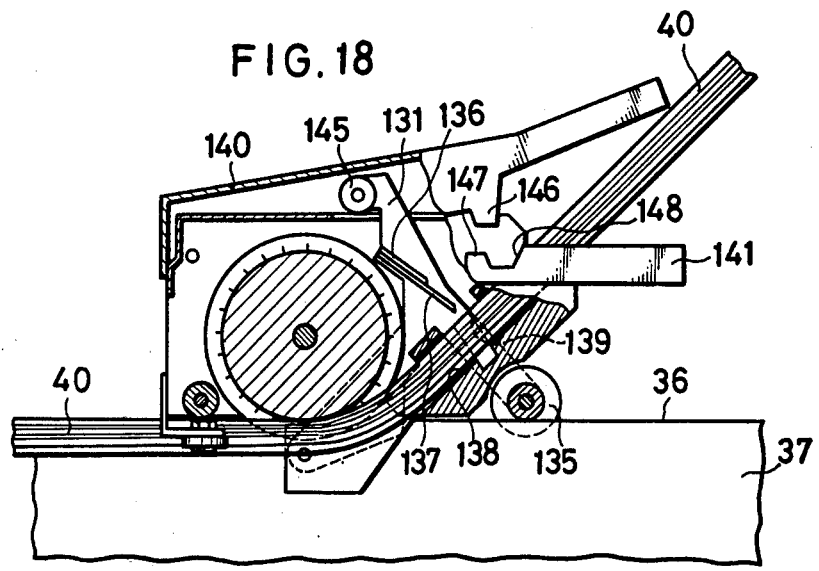
FIG. 18 is a view similar to FIG. 16, showing the device with parts broken away.

According to a modified gasket installing device 130 shown in FIGS. 16 through 18, a cutter arm 131 is disposed in a hollow frame 132 and has a central limb 133 extending therefrom and pivoted at its distal end to a pair of legs 134 projecting downwardly from the frame 132. The cutter arm 131 rotatably supports a guide roller 135 on one end, the guide roller 135 being disposed outside the frame 132 at its leading end. The cutter arm 131 has a cutter 136 fixed centrally thereto, the cutter 136 having a blade 137 directed toward the guide roller 135. A gasket guide has a passage 138 in the hollow frame 132 and has a slot 139 extending thereacross. The cutter arm 131 is pivotable to move the cutter blade 137 into and out of the slot 139.

A lever 140 is pivoted at one end to the frame 132, the other end of the lever 140 being disposed over and movable toward and away from a handle 141 slidably supported on the frame 132 at its leading end. The handle 141 is a hollow structure fitted over a guide 142 projecting from the frame 132. A screw 144 extends transversely through a wall of the handle 141 into a horizontal groove 143 in the guide 142 to limit the sliding movement of the handle 141 to the length of the groove 143.

The cutter arm 131 has on the other end a small roller 145 engageable with the lever 140 so that the cutter arm 131 can be moved in response to the movement of the lever 140 toward the handle 141 to allow the cutter blade 137 to enter into the slot 139 across the passage 138. The lever 140 has a projection 146 directed toward and engageable with a portion 147 of the handle 141. When the lever 140 pivots toward the handle 141 until the projection 146 abuts against the handle portion 147, the lever 140 depresses the small roller 145 and hence the cutter arm 131 to permit the cutter blade 137 to be inserted halfway into the slot 139. The handle 141 has a recess 148 adjacent to the portion 147 for receiving therein the projection 146 on the lever 140. After the handle 141 has been slid toward the frame 132 to a position in which the recess 148 is in the path of movement of the projection 146, the lever 140 is pivotally moved toward the handle 141 until the projection 146 fully enters the recess 148. At this time, the cutter arm 131 is further depressed to allow the cutter blade 137 to be inserted substantially all the way into the slot 139. A spring 149 acts between the guide 142 and the handle 141 to normally urge the handle 141 in a direction away from the frame 132 to prevent the projection 146 on the lever 140 from being received in the recess 148 in the handle 141 when the lever 140 is moved closer to the handle 141.

A spring 150 acts between the frame 132 and the limb 133 on the cutter arm 131 to normally urge the cutter arm 131 upwardly, namely in a direction to retract the cutter blade 137 out of the slot 139.

Figure 21:
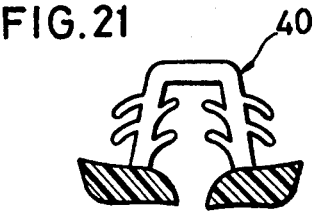
FIG. 21 is an enlarged cross-sectional view showing the gasket at a point where it is cut.
Figure 22:
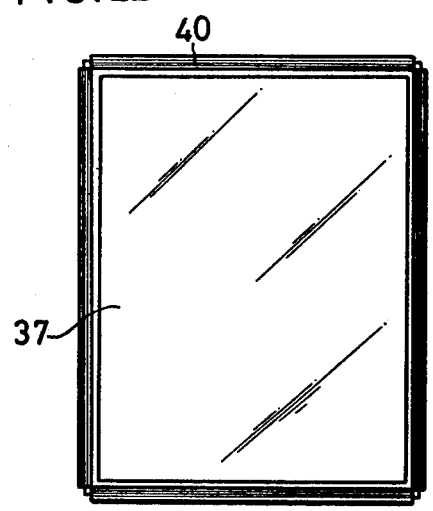
FIG. 22 is a front elevational view of a gasket installed along and around the edges of a panel.

To install the gasket 40 on and over the panel edge 36, the end of the gasket 40 is inserted through the passage 138 until it extends under the presser wheel. Then, the lever 140 and the handle 141 are gripped together, and the gasket installing device 130 is pulled along the panel edge 36. The gasket 40 is pressed down by the presser wheel so as to cover the panel edge 36 and, then, is rectified by the correction roller assembly so as to be properly disposed over the panel edge 36. When the device 130 arrives at a corner of the panel edge 36 as shown in FIG. 19, the guide roller 135 rolls around the corner due to the force with which the lever 140 is pushed toward the handle 141. The cutter arm 131 is depressed and the cutter blade 137 enters the slot 139, whereupon it cuts the gasket 40 in the passage 138. The cutting movement of the cutter blade 137 is arrested at a point substantially halfway in the slot 139 by the engagement of the projection 146 with the portion 147 of the handle 141. At this time, the gasket 40 is cut as illustrated in FIG. 21. The location of the cutter 136 and the slot 139, and the positional relationship of the guide roller 135 therewith are such that the cut portions of the gasket 40 correspond to the corners of the panel edge 36 when the gasket 40 is completely installed, as shown in FIG. 22.

When it is necessary to sever off the gasket 40, the handle 141 is pushed toward the frame 132 to bring the recess 148 into the path of movement of the projection 146 on the lever 140 as the device 130 approaches a panel edge corner (FIG. 20). Upon rolling movement of the guide roller 135 around the corner, the cutter arm 131 is allowed to pivot down until the projection 146 on the lever 140 is seated in the recess 148 in the handle 141, whereupon the cutter blade 137 is caused to project substantially all the way into the slot 139 across and beyond the gasket 40 in the passage 138, thereby severing the gasket 40. The gasket installing device 130 can be removed simply by pulling it along and off the panel edge 36.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A device for installing an elongate gasket continuously along an edge of a panel, comprising:
   (a) a frame body having a leading end and a trailing end;
   (b) a guide roller rotatably mounted on said body at said leading end for rolling engagement with the panel edge for guiding said body to move therealong;
   (c) a gasket guide passage disposed within said body, said passage having a cross-sectional configuration engageable with the gasket for guiding it, said passage extending at an obtuse angle with respect to the lower edge of said body from a point above said roller at said leading end toward said trailing end and to a discharge opening where guiding terminates adjacent to the panel; and
   (d) means at said discharge opening on said body for engaging and pressing the elongate gasket against the panel edge.

2. A device according to claim 1, said guide roller having spaced flanges engageable with opposite external sides of the panel.

3. A hand-held and operated device for installing an elongate gasket continuously along an edge of a panel, comprising;
   (a) A hollow frame having a leading end and a trailing end, said hollow frame having an open side;
   (b) A guide roller rotatably mounted at said leading end for rolling engagement with the panel edge for guiding said hollow frame to move therealong;
   (c) a presser wheel rotatably disposed in said hollow frame between said leading and trailing ends, said presser wheel having means on its circumference for engaging and pressing the elongate gasket against the panel edge at a position adjacent to said open side; and
   (d) a gasket guide block disposed within said hollow frame adjacent to said leading end, said gasket guide block having a passage with a cross-sectional configuration engageable with the gasket for guiding it therethrough toward said position, said passage extending at an obtuse angle with respect to said open side of said frame, said passage having a discharge opening where guiding terminates and spaced from said position and from said open side.

4. A device according to claim 3, said means comprising a plurality of pointed projections extending radially outwardly from said presser wheel and spaced circumferentially apart from each other.

5. A device according to claim 3 for installing a channel-shaped elongate gasket having a bottom, a pair of sidewalls, and a pair of lips on the sidewalls, said gasket guide passage including a first chamber for accommodating the bottom and sidewalls of the gasket therein, a second chamber for accommodating the lips therein, said first chamber being narrower than said second chamber, and a partition extending centrally from the bottom of said second chamber into said first chamber.

6. A device according to claim 5, further including a pair of projections disposed between said first and second chambers toward each other.

7. A device according to claim 3, further comprising a handle rigidly secured to said frame at the leading end.

8. A device according to claim 7, further comprising a lever pivoted to said frame and normally biased away from said handle, a prong pivoted to said frame and normally biased to project into the path of movement of the gasket in said passage, and said prong being retractable out of the passage in response to the movement of said lever toward said handle.

9. A device for installing an elongate gasket continuously along an edge of a panel, comprising:
   (a) a hollow frame having a leading end and a trailing end, said hollow frame having an open side;
   (b) a shaft fixed to said frame;
   (c) a guide roller rotatably mounted at said leading end for rolling engagement with the panel edge for guiding said hollow frame to move therealong;
   (d) a presser wheel rotatable on said shaft and disposed in said hollow frame between said leading and trailing ends, said presser wheel having means on its circumference for engaging and pressing the elongate gasket against the panel edge at a position adjacent to said open side, said presser wheel containing a plurality of feed rollers mounted therein for rotation about and with axles parallel to said shaft, each of said feed rollers having a circumferential surface lying substantially flush with said circumference of said presser wheel, each of said feed rollers further having on its circumference a plurality of pointed projections extending radially outwardly therefrom and spaced apart from each other, and a gear mechanism for rotating said feed rollers in response to the rotation of said presser wheel; and
   (e) a gasket guide disposed in said hollow frame adjacent to said leading end, said gasket guide having a passage for permitting the gasket to pass therethrough toward said position, and said passage extending at an angle to said open side and having a discharge opening spaced from said position and from said open side.

10. A device according to claim 9, said gear mechanism comprising a sun gear fixed to said shaft and planet gears fixed respectively to said axles, and said sun gear being in driving mesh with said planet gears.

11. A device according to claim 9, said presser wheel having additional pointed projections extending radially outwardly therefrom and spaced apart from each other, and disposed on its circumference between said feed rollers.

12. A device for installing a channel-shaped elongate gasket, having a bottom and a pair of sidewalls continuously along an edge of a panel, comprising:
   (a) a hollow frame having a leading end and a trailing end, said hollow frame having an open side;
   (b) a guide roller rotatably mounted at said leading end for rolling engagement with the panel edge for guiding said hollow frame to move therealong;
   (c) a presser wheel rotatably disposed in said hollow frame between said leading and trailing ends, said presser wheel having means on its circumference for engaging and pressing the elongate gasket against the panel edge at a position adjacent to said open side;
   (d) a gasket guide disposed in said hollow frame adjacent to said leading end, said gasket guide having a passage for permitting the gasket to pass therethrough toward said position, and said passage extending at an angle to said open side and having a discharge opening spaced from said position and from said open side; and
   (e) a correction roller assembly at said trailing end, said assembly including a central roller rotatably mounted on said hollow frame for pressing the bottom of the gasket against the panel edge, and a pair of side rollers rotatably mounted on the frame for pressing the sidewalls of the gasket against the surfaces of the panel with the panel edge disposed between the sidewalls of the gasket.

13. A device according to claim 12, said central roller being rotatable in a plane parallel to the plane in which said presser wheel rotates.

14. A device according to claim 13, said side rollers being rotatable in planes parallel to said second-mentioned plane.

15. A device according to claim 13, said side rollers being rotatable in a plane transverse to said second-mentioned plane.

16. A device according to claim 12, said central roller being supported on a support mounted on and movable relatively to said frame, and said support being normally biased in a direction to urge said central roller toward the bottom of the gasket.

17. A device according to claim 16, there being a stop on said frame, engageable with said support for limiting the movement of said support opposite to said direction.

18. A device according to claim 16, there being a stop on said support, engageable with said frame for limiting the movement of said support in said direction.

19. A device according to claim 12, said central roller being disposed in and directly supported on said hollow frame.

20. A device according to claim 12, said side rollers being supported respectively on a pair of side arms pivoted to said frame and normally biased in a direction to move said side rollers toward each other.

21. A device according to claim 20, there being a pair of stops respectively on said side arms, engageable with said frame for restricting the movement of said side rollers toward each other.

22. A device according to claim 12, said presser wheel including a pair of flanges carried at opposite sides of said circumference and engageable with said sidewalls of said gasket.

23. A device according to claim 22, including a pair of guide plates carried by said frame for projecting between said sidewalls of the gasket and receptive of the panel therebetween, said guide plates having a portion extending between said presser wheel flanges, and said guide plates extending along the gasket path from said gasket guide passage to said presser wheel.

24. A device according to claim 12, including a pair of flanged wheels rotatably carried on said frame, and so disposed ahead of said correction roller assembly that the flanges thereof spread the sidewalls of the gasket.

25. A device according to claim 24 in which said flanged wheels act on the same increment of gasket length that said presser wheel acts on.

26. A device for installing an elongate gasket continuously along an edge of a panel, comprising:
   (a) A hollow frame having a leading end and a trailing end, said hollow frame having an open side;
   (b) a guide roller rotatably mounted at said leading end for rolling engagment with the panel edge for guiding said hollow frame to move therealong;
   (c) a presser wheel rotatably disposed in said hollow frame between said leading and trailing ends, said presser wheel having means on its circumference for engaging and pressing the elongate gasket against the panel edge at a position adjacent to said open side;
   (d) a gasket guide disposed in said hollow frame adjacent to said leading end, said gasket guide having a passage for permitting the gasket to pass therethrough toward said position, and said passage extending at an angle to said open side and having a discharge opening spaced from said position and from said open side; and
   (e) a cutter arm disposed in and pivoted to said hollow frame, said guide roller being attached to one end of said cutter arm, said cutter arm having a cutter blade thereon and being pivotable to move said cutter blade into and out of a slot in said gasket guide extending across said passage.

27. A device according to claim 26, further comprising a lever pivoted to said frame and a handle slidably supported on said frame, said cutter arm having the other end engageable with said lever, and said cutter arm being movable to allow said cutter blade to enter into said slot in response to the movement of said lever toward said handle.

28. A device according to claim 27, said lever having a projection which is engageable with a portion of said handle in a first handle position, and said cutter blade being insertable halfway into said slot when said projection engages said portion of the handle.

29. A device according to claim 28, said handle having a recess adjacent to said handle portion for receiving therein said projection of said lever, said handle being slidable to a second position in which said recess is located in the path of movement of said projection, and said cutter blade being insertable substantially all the way into said slot when said projection is received in said recess.

30. A device according to claim 29, said handle being normally urged away from said second position.

31. A device according to claim 26, there being a spring acting between said frame and said cutter arm to normally bias said cutter arm in a direction to retract said cutter blade out of said slot.

* * * * *